United States Patent [19]
Goese

[11] Patent Number: 5,873,292
[45] Date of Patent: Feb. 23, 1999

[54] HOLDDOWN BAR FOR POWER NOTCHER

[76] Inventor: James A. Goese, 6245 Clark Center Ave., Unit P, Sarasota, Fla. 34238

[21] Appl. No.: 883,274

[22] Filed: Jun. 26, 1997

[51] Int. Cl.$^6$ ....................................................... B26D 7/02
[52] U.S. Cl. ................................. 83/452; 83/459; 83/464; 83/468.7; 83/917
[58] Field of Search ............................. 83/452, 459, 464, 83/466, 467.1, 468.7, 693, 917; 269/87.2, 87.3, 295, 307; 409/225, 903; 408/103

[56] References Cited

U.S. PATENT DOCUMENTS

| | | | |
|---|---|---|---|
| 3,996,829 | 12/1976 | Tromponi | 83/522 |
| 4,283,978 | 8/1981 | Kasai et al. | 83/620 |
| 4,433,600 | 2/1984 | Ikeda | 83/468 |
| 4,771,669 | 9/1988 | Bianchi | 83/467 R |
| 5,026,222 | 6/1991 | Kawano et al. | 409/225 |
| 5,299,896 | 4/1994 | Ferri | 408/72 R |
| 5,586,929 | 12/1996 | Butcher et al. | 451/213 |

OTHER PUBLICATIONS

The Eagle 250 Hydraulic Power Notcher Brochure of Boschert GmbH + Co. KG.

*Primary Examiner*—Peter Vo
*Assistant Examiner*—Kevin G. Vereene
*Attorney, Agent, or Firm*—Charles J. Prescott

[57] ABSTRACT

An improved elongated holddown bar for use in conjunction with a power corner notcher having a table which defines a horizontal working surface. The notcher includes a clamp means adjustably positionable on, and connectable to, the table atop the work surface which immobilizes the holddown bar in a selected position to establish either of two upright side edges of the holddown bar against which a piece of sheet metal may be positioned. One of these edges includes a recess formed entirely therealong which defines a recessed upright abutting surface and a horizontal holddown surface spaced above the working surface a height substantially equal to the thickness of the sheet metal whereby the notching operation into the edge of the sheet metal cannot substantially buckle or distort the edge of the sheet metal.

4 Claims, 3 Drawing Sheets

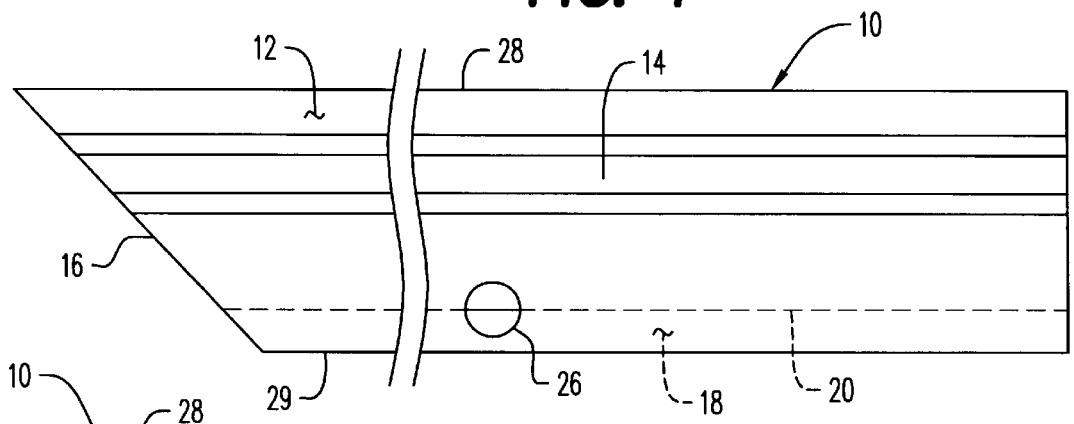
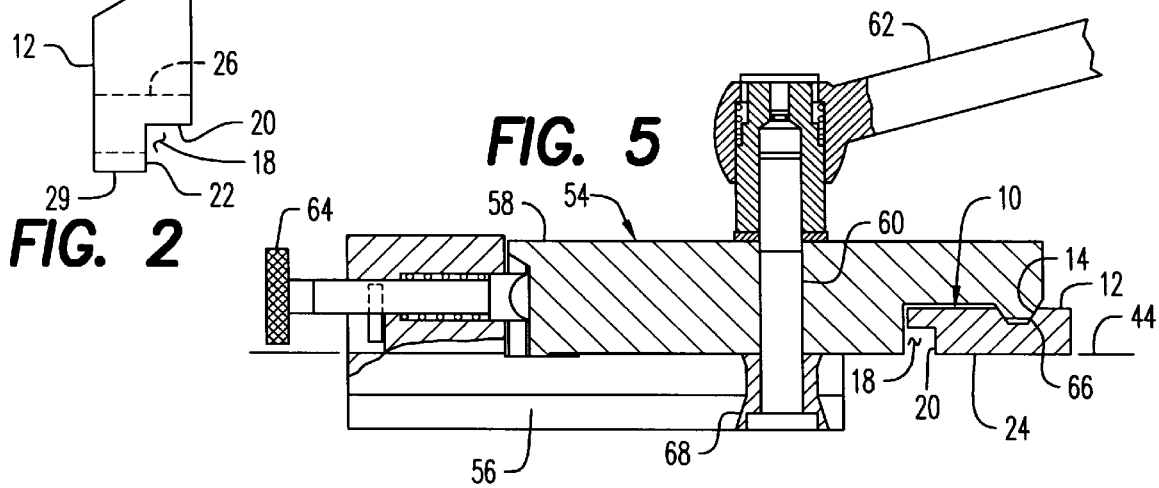
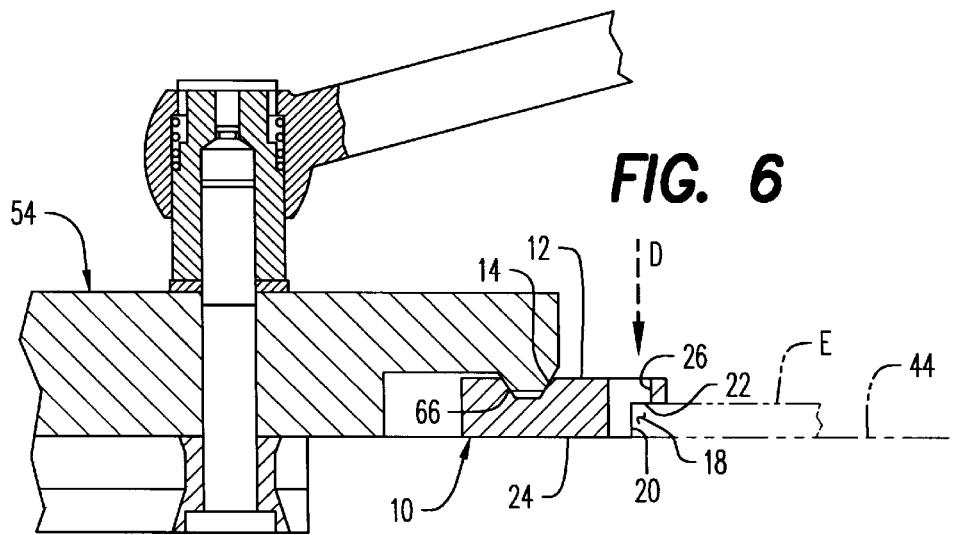

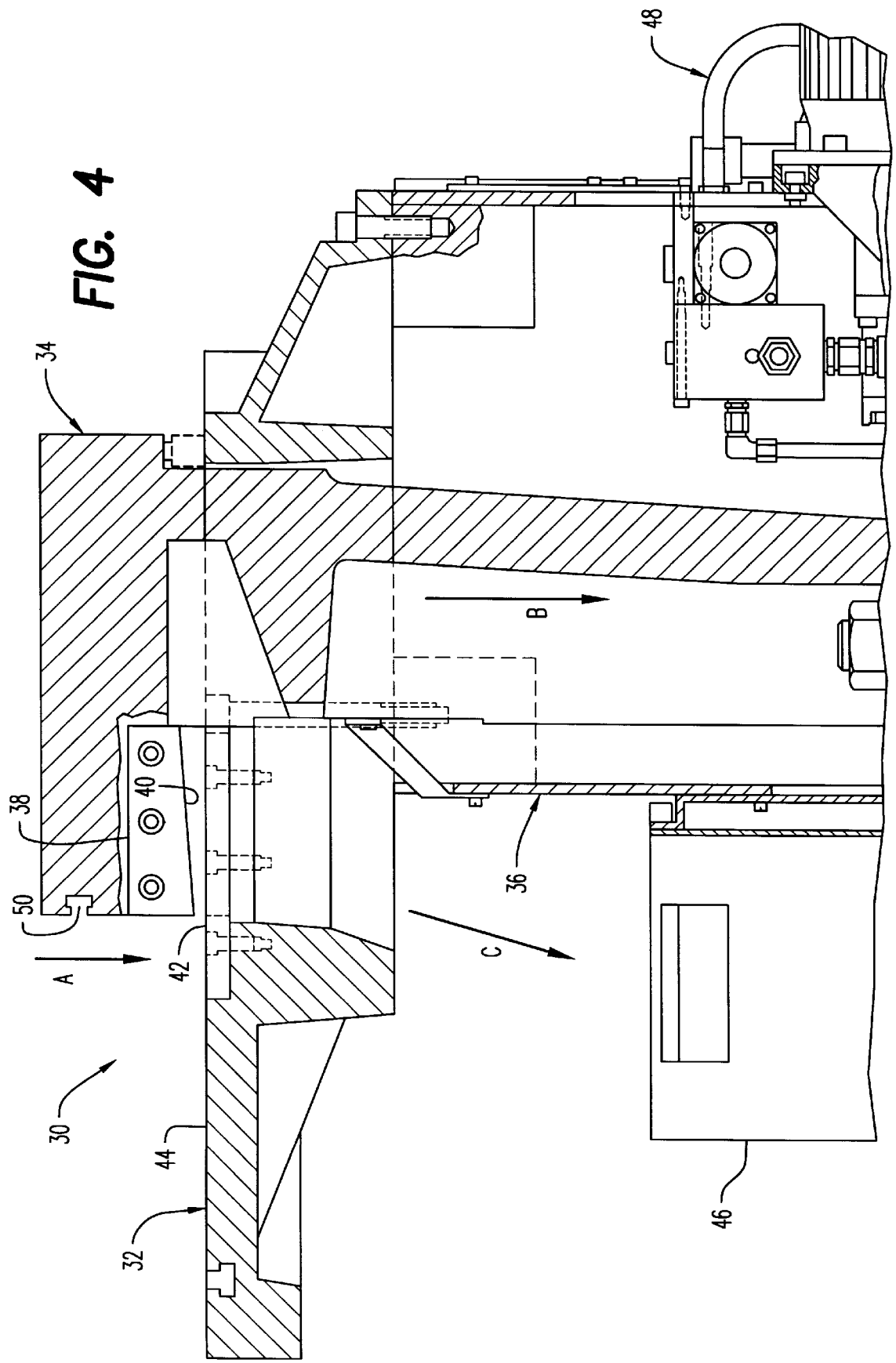

HOLDDOWN BAR FOR POWER NOTCHER

BACKGROUND OF THE INVENTION

1. Scope of Invention

This invention relates generally to apparatus for cutting and forming sheet metal, and more particularly to an accessory holddown bar for use in conjunction with a power corner notcher.

2. Prior Art

Power corner notchers, more generally referred to as power notchers, are well known in the industry. Applicant distributes a line of such hydraulic power notchers manufactured by Boschert GmbH+Co. KG, in Lorrach, Germany under the trademark EAGLE. These power notchers are designed to form a 90° notch into an edge of a piece of sheet metal which may range in thickness up to in the range of thickness of about ¼".

These power notchers include a horizontal table which defines a work surface having slots formed therein for receiving easily engagable clamps which secure, for example, an elongated bar stop having orthogonally oriented side edge surfaces against which the sheet metal may be abutted and aligned for proper positioning prior to the notching operation. These adjustable clamps may be positionable as desired atop the table and within the slots formed therein. Further adjustment is achieved by these adjustable clamps by rotation about an upright central axis thereof so as to angularly position these stop bars with respect to the cutting blades of the power notcher. Further adjustment is achieved by the slidable positioning of the stop bar with respect to the adjustable clamps before tightening thereof.

In notching sheet metal of this thickness and strength, the edges of the sheet metal adjacent to the notched area tend to buckle or deform upwardly in an undesirable fashion. An accessory for the Boschert equipment for addressing this problem is available in the form of spring actuated holddowns which are attached to the movable cutting head or ram of the power notcher immediately adjacent to the cutting blades so as to engage against the upper surface of the sheet metal as the movable cutting head is downwardly displaced during each cutting operation. However, in addition to being relatively expensive, these holddowns are somewhat less than effective in eliminating this edge distortion during notching.

The present invention is an improvement in the stop bar so as to expand its general useful characteristics into a combination stop bar and holddown device for preventing edge distortion of the sheet metal completely. The improvement represents the addition of an inside square corner-shaped recess formed into the lower surface of the stop bar along one side edge thereof. By this arrangement, a recessed upright abutting surface is provided against which the sheet metal may be aligned and held, and a horizontal holddown surface displaced above the working surface a distance or height generally equal to the thickness of the sheet metal being cut. The improved combination stop bar and holddown bar also includes a viewing hole to ensure that the sheet metal is fully against the recessed abutting surface prior to notching operation for optimal positional accuracy of the sheet metal.

BRIEF SUMMARY OF THE INVENTION

This invention is directed to an improved elongated holddown bar for use in conjunction with a power corner notcher having a table which defines a horizontal working surface. The notcher includes a clamp means adjustably positionable on, and connectable to, the table atop the work surface which immobilizes the holddown bar in a selected position to establish either of two upright side edges of the holddown bar against which a piece of sheet metal may be positioned. One of these edges includes a recess formed entirely therealong which defines a recessed upright abutting surface and a horizontal holddown surface spaced above the working surface a height substantially equal to the thickness of the sheet metal whereby the notching operation into the edge of the sheet metal cannot substantially buckle or distort the edge of the sheet metal.

It is therefore an object of this invention to provide an improved combination stop bar and holddown device for use in conjunction with power corner notchers.

It is yet another object of this invention to provide a simple, economical to manufacture device for preventing edge distortion of sheet metal during power notching operations.

It is still another object of this invention to provide an improved stop bar and holddown device which includes a viewable port or hole formed therethrough for insuring that sheet metal is properly aligned and abutted against the holddown recess formed along one side edge of the bar prior to notching operations.

In accordance with these and other objects which will become apparent hereinafter, the instant invention will now be described with reference to the accompanying drawings.

BRIEF DESCRIPTION OF THE DRAWINGS

FIG. 1 is a top plan broken view of the invention (10).

FIG. 2 is an end elevation view of FIG. 1.

FIG. 4 is a side elevation section view of an upper portion of the power corner notcher (30) shown in FIG. 3.

FIG. 5 is a side elevation section view of the clamping device (54) shown in FIG. 3 with the invention (10) shown in one orientation of use.

FIG. 6 is a view similar to FIG. 5 with the invention (10) in a preferred orientation for use as both a sheet metal stop or abutment and a sheet metal anti-edge distortion device.

DETAILED DESCRIPTION OF THE INVENTION

Figure 3:
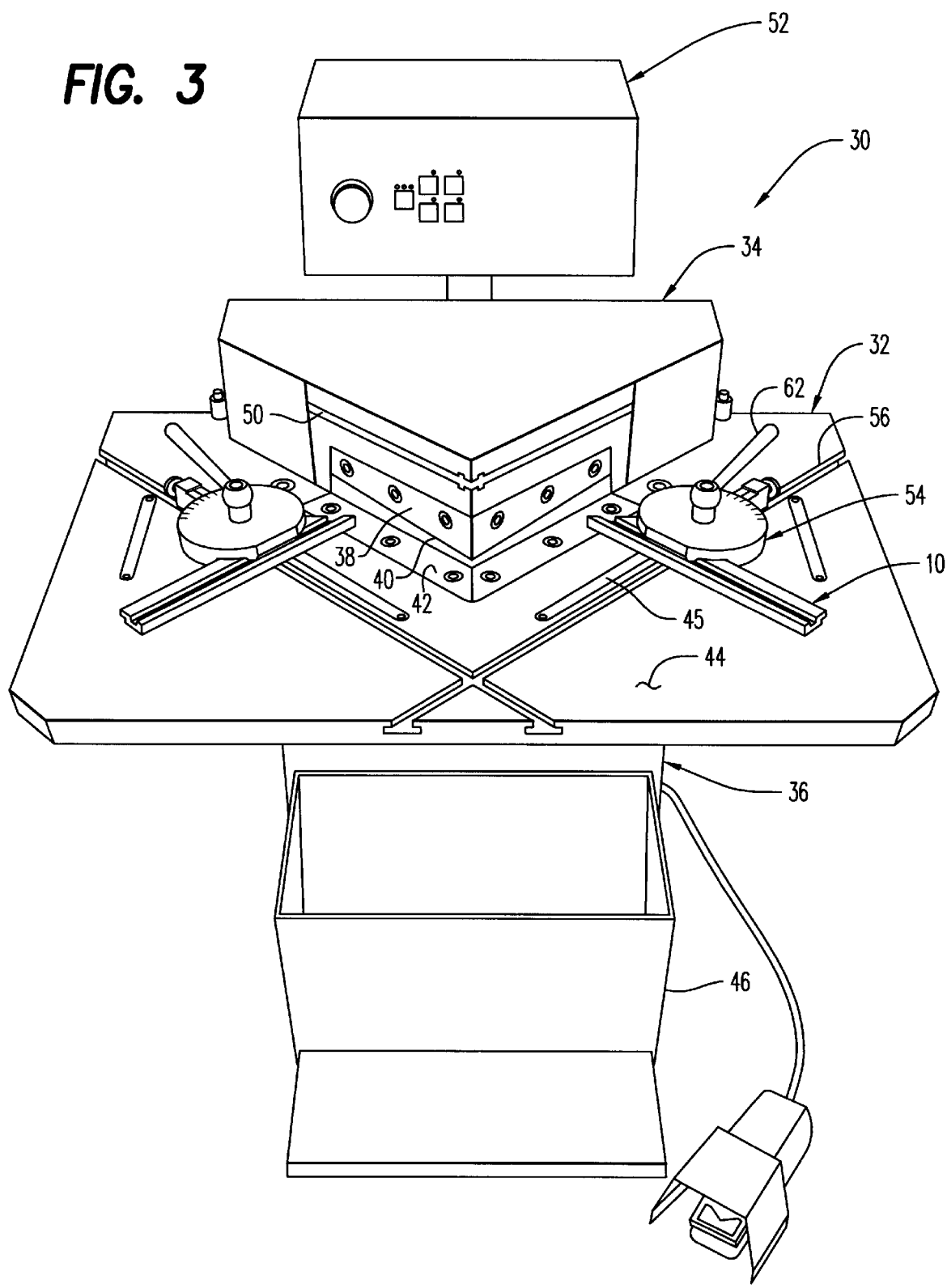
FIG. 3 is a perspective view of a power corner notcher (30) and the invention (10) attached thereto in a ready-for-use position.

Referring now to the drawings, the invention is shown generally at numeral 10 as best seen in FIGS. 1 and 2, being formed of an elongated piece of hardened steel of generally rectangular cross section. In plan view, one end 16 is cut at 45° with respect to the length of the device 10 for facilitating close positioning of the device 10 to the cutting blades 40 and 42 of the power corner notcher 30 as seen in FIGS. 3 and 4.

A groove 14 having sloping side surfaces as shown is formed lengthwise into the upper surface of the device 10. A square-sided recess 18 which defines a recessed abutting surface 20 which is orthogonally oriented to the lower surface 24 of stop bar 12 and a holddown surface 22 which is generally parallel to the lower surface 24 and spaced therefrom a distance or height substantially equal to the thickness of a piece of sheet metal being notched in the power corner notcher 30.

Referring now additionally to FIGS. 3 and 4, the power corner notcher 30 generally includes a rigid horizontally disposed table 32 defining a flat work surface 44 with preferably orthogonally oriented cutting blades 38 operably disposed in relation to upright cutting blades 40 which are connected to a moveable ram shown generally at numeral 34. The ram 34 is moved downwardly in the direction of arrow B during each cutting cycle to effect sheet metal notching action between blades 40 and the edges 42 of movable blades 38 which move downwardly in the direction of arrow A, the ram 34 being downwardly actuated by a hydraulic pump arrangement shown generally at numeral 48. Sheet metal scrap which is sheered away by this notching action between blades 38 and 42 is downwardly disposed of in the direction of arrow C into a scrap container 46.

The table 32 is supported atop a base or frame assembly shown generally at numeral 36 which also supports the hydraulic pump arrangement 48. The ram 34 also includes horizontal slots 50 which are utilized to supportively retain conventional spring loaded holddown prior art devices (not shown) which had been used in the past to partially satisfy the need for preventing distortion of the sheet metal during the notching operation. An equipment control module 52 is also provided disposed directly above the ram 34 for operational convenience.

Connected to the table 32 are two clamp assemblies 54 as seen in FIGS. 3, 5 and 6 which lockingly engage within one of the slots 56 by the wedging action of the lower enlarged end 68 of threaded bolt 60 as adjustable handle 62 is appropriately rotated. Fine horizontal linear positional adjustment of the clamp 54 is effected by rotation of adjusting knob 64.

The clamp 54 also includes an engaging lip or flange 66 having tapered side margins which lockingly engage into the mating groove 14 formed longitudinally into the top surface 12 of stop bar 10 as previously described. By this arrangement, by the tightening of adjustable handle 62, the lip 66, when properly engaged into groove 14 as seen in FIGS. 3, 5 and 6, forces the stop bar 10 downwardly against the working surface 44 of table 32 to fully immobilize the stop bar 10 in the chosen position.

The device 10 as seen in FIGS. 3 and 5, is oriented with respect to groove 14 so that side edge surface 28 is outwardly facing for use. In this configuration, recess 18 is not used. In use, each of the clamps 54 is positioned as desired within slots 56 and in conjunction therewith, each of the stop bars 10 is rotationally oriented about the axis of threaded bolts 60 and slidably engaged laterally or longitudinally with respect to itself along groove 14. When each stop bar 10 is properly positioned atop table 32 and with respect to cutting blades 38 and 42, the adjustable handles 62 are locked to secure each selected arrangement.

Referring particularly to FIG. 6, the stop bar 10 is shown in an in-use orientation with respect to lip 66 in groove 14 such that recess 18 formed inwardly and coextensive with side edge surface 28 is outwardly facing with respect to the clamp 54. In this configuration, a piece of sheet metal shown in phantom at E is slidably engaged into recess 18 so that one of its edges abuts the upright recessed abutting surface 20. Again, the height of the holddown surface 22 is spaced above the working surface shown in phantom at 44 a distance substantially equal to the thickness of the sheet metal E. By this arrangement, during the notching operation, the edge of the sheet metal E held in place by the recess 18 cannot buckle up or become deformed in any way whatsoever.

To ensure full and complete engagement of the edge of the sheet metal E into and against recess 18 and against the recessed abutting surface 20, a viewing aperture or hole 26 is positioned so as to straddle the recessed surface 20 as best seen in FIG. 6. By viewing the edge of the sheet metal E in the direction of arrow D, the operator of the power notcher 30 may quickly observe whether the edge of the sheet metal E is fully against the recessed abutting surface 20. This viewing hole 26 also facilitates viewing of the brass scales 45 in Table 32 for accurate setup of each stop bar 10 in clamp 54.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A combination stop and holddown bar for use in conjunction with a power corner notcher having a table defining a working surface which extends up to a cutting means for notching an edge of a piece of sheet metal, the power corner notcher also including a clamp means for being securable to the table atop the working surface after being selectively positioned with respect to said cutting means, comprising:

a single elongated stop bar having straight parallel first and second side edges orthogonally oriented with respect to a lower surface of said stop bar;

a groove formed into and substantially coextensive with an upper surface of said stop bar which is slidably engagable with respect to said clamp means when said clamp means is unlocked, said stop bar being immobilized against the working surface when said clamp means, being engaged to the table, is tightened downwardly against said groove;

a recess formed into and coextensive with said first side edge having a substantially uniform substantially orthogonal transverse shape, said recess defined by an upright substantially planar recessed abutting surface spaced inwardly from, and parallel to, said first side edge, said recessed abutting surface extending upwardly from said lower surface toward but not to said upper surface and a holddown surface which extends substantially horizontally from an upper edge of said recessed abutting surface to said first side edge;

said hold down surface spaced above and parallel to the working surface a distance equal to or greater than a thickness of the sheet metal whereby the sheet metal edge is slidingly insertable into said recess and against said recessed abutting surface and is restrained in unclamped fashion only by said holddown surface from substantial upward or buckling movement during notching of the sheet metal.

2. A combination stop and holddown bar as set forth in claim 1, further comprising:

an upright sight hole formed through said stop bar in alignment with said recessed abutting surface whereby whether the edge of the sheet metal is fully engaged against said recessed abutting surface is viewable through said sight hole.

3. A combination stop and holddown bar of a power notcher having a table defining a working surface which extends up to a cutting means for notching and cutting an edge of a piece of sheet metal, the power notcher also including a clamp means for being secured to the table atop the working surface after being selectively positioned and oriented with respect to said cutting means, comprising:

a single elongated stop bar having a generally rectangular transverse cross section and straight parallel first and second side edges orthogonally oriented with respect to a self-supporting lower surface of said bar;

a groove formed longitudinally into and substantially coextensive with an upper surface of said bar which is slidably engagable with respect to said clamp means when said clamp means is unlocked, said stop bar being immobilized and fixed in place atop the working surface when said clamp means is tightened downwardly against said groove;

a substantially uniform recess formed longitudinally into and coextensive with said first side edge, said recess defined by an upright substantially planar recessed abutting surface spaced inwardly from, and parallel to, said first side edge, said recessed abutting surface extending upwardly from said lower surface toward but not to said upper surface and a holddown surface;

said holddown surface fixedly spaced above and substantially parallel to the working surface, when said stop bar is secured by said clamp means, a vertical distance slightly larger than a thickness of the sheet metal to permit free sliding engagement of the sheet metal into said recess and against said recessed abutting surface whereby the sheet metal edge is restrained in unclamped fashion by said holddown surface from substantial upward buckling movement during notching of the sheet metal.

4. For a power notcher having cutting means for notching and cutting an edge of a piece of sheet metal which is freely positionable and supported atop a horizontal table of the power notcher, the edge of the sheet material adjacent to the notch cutting means tending to buckle or upwardly distort from the table during notching or cutting of the sheet metal, the improvement comprising:

an elongated stop bar having a generally rectangular cross section with a grooved upper surface adapted for being clampingly engaged by a separate table clamp means to immobilize said stop bar in a selected position and orientation with respect to said cutting means;

a recess having a uniform substantially orthogonal transverse shape formed along and coextensive with a side edge surface of said stop bar;

said recess extending upwardly from a lower surface of said stop bar toward but not to said upper surface to a horizontal holddown surface and inwardly from said side edge surface to an upright elongated recessed abutting surface of said recess;

said recess having a fixed height from said lower stop bar surface to said holddown surface at least as great as a thickness of the sheet metal whereby, when the sheet metal edge is slidably engaged into said recess and against said recessed second abutting surface, the sheet metal edge is restrained from substantial upward or buckling movement only by upward contact with said holddown surface during notching of the sheet metal.

* * * * *